(12) United States Patent
Uan-Zo-Li

(10) Patent No.: US 9,261,934 B2
(45) Date of Patent: Feb. 16, 2016

(54) DYNAMIC RESPONSE IMPROVEMENT OF HYBRID POWER BOOST TECHNOLOGY

(71) Applicant: Intel Corporation, Santa Clara, CA (US)

(72) Inventor: Alexander B. Uan-Zo-Li, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 178 days.

(21) Appl. No.: 13/839,197

(22) Filed: Mar. 15, 2013

(65) Prior Publication Data

US 2014/0281591 A1  Sep. 18, 2014

(51) Int. Cl.
*G06F 1/00* (2006.01)
*G06F 1/26* (2006.01)
*H02J 7/00* (2006.01)

(52) U.S. Cl.
CPC ............. *G06F 1/263* (2013.01); *H02J 7/007* (2013.01); *H02J 7/0065* (2013.01); *H02J 2007/0059* (2013.01)

(58) Field of Classification Search
CPC . H02J 7/007; H02J 2007/0059; H02J 7/0065; G06F 1/263
See application file for complete search history.

(56) References Cited

U.S. PATENT DOCUMENTS

| | | | |
|---|---|---|---|
| 6,009,488 A | 12/1999 | Kavipurapu | |
| 7,769,883 B2 | 8/2010 | Harriman et al. | |
| 7,949,794 B2 | 5/2011 | Ajanovic | |
| 8,218,580 B2 | 7/2012 | Harriman | |
| 8,437,343 B1 | 5/2013 | Wagh et al. | |
| 8,446,903 B1 | 5/2013 | Ranganathan et al. | |
| 8,549,205 B1 | 10/2013 | Harriman et al. | |
| 8,972,640 B2 | 3/2015 | Wagh | |
| 2006/0023633 A1 | 2/2006 | Caruk et al. | |
| 2006/0184809 A1 | 8/2006 | Kojou et al. | |
| 2006/0187689 A1* | 8/2006 | Hartular | 363/63 |
| 2008/0065796 A1 | 3/2008 | Lee | |
| 2008/0109565 A1 | 5/2008 | Ajanovic | |
| 2008/0233912 A1 | 9/2008 | Hunsaker et al. | |
| 2008/0235528 A1 | 9/2008 | Kim et al. | |
| 2008/0294831 A1 | 11/2008 | Mao | |

(Continued)

FOREIGN PATENT DOCUMENTS

| | | |
|---|---|---|
| CN | 1838503 A | 9/2006 |
| TW | M427729 U1 | 4/2012 |
| TW | 201304351 A | 1/2013 |

OTHER PUBLICATIONS

"Integrated Circuit", Feb. 12, 2005, Wikipedia.*

(Continued)

*Primary Examiner* — Jaweed A Abbaszadeh
*Assistant Examiner* — Xuxing Chen
(74) *Attorney, Agent, or Firm* — Alpine Technology Law Group LLC

(57) ABSTRACT

Methods and apparatus relating to improving dynamic response of hybrid power boost technology are described. In one embodiment, two or more levels of charger over-current are used for AC adapters/chargers during transition from charging (e.g., one or more battery packs) to boosting platform performance (e.g., by increasing the operating frequency of one or more processor cores of a processor). In another embodiment, an adapter's voltage level is used as a trigger for fast transition from charging to boosting. Other embodiments are also disclosed and claimed.

25 Claims, 7 Drawing Sheets

(56) References Cited

U.S. PATENT DOCUMENTS

| | | | |
|---|---|---|---|
| 2009/0106476 A1 | 4/2009 | Jenkins et al. | |
| 2009/0141654 A1 | 6/2009 | Voutilainen | |
| 2010/0014541 A1 | 1/2010 | Harriman | |
| 2010/0081406 A1 | 4/2010 | Tan | |
| 2010/0123435 A1* | 5/2010 | Piazza | H02J 7/0063 320/128 |
| 2010/0325463 A1 | 12/2010 | Lindsay | |
| 2010/0332868 A1 | 12/2010 | Tan et al. | |
| 2011/0060931 A1 | 3/2011 | Radhakrishnan et al. | |
| 2011/0066771 A1 | 3/2011 | Renaud | |
| 2012/0054504 A1 | 3/2012 | Kung | |
| 2012/0120959 A1 | 5/2012 | Krause | |
| 2013/0088203 A1* | 4/2013 | Solie | 320/129 |
| 2013/0307464 A1* | 11/2013 | Zhu | H02J 7/0055 320/101 |
| 2014/0006670 A1 | 1/2014 | Wagh | |

OTHER PUBLICATIONS

Office Action and Search Report received for Taiwanese Patent Application No. 103107445, mailed on Jul. 29, 2015, 16 pages including 7 pages of English translation.

Office Action issued in U.S. Appl. No. 13/477,304, mailed on Mar. 22, 2013.

Office Action issued in U.S. Appl. No. 13/477,310 mailed on Aug. 14, 2012.

Office Action issued in U.S. Appl. No. 13/477,304, mailed on Sep. 20, 2012.

Intel Corporation, "An Introduction to the Intel Quick Path Interconnect", Jan. 2009, pp. 1-22.

MIPI Alliance, "Physical Layer Specifications: MIPI Alliance Launches M-PHY v1.0 + Uni Pro v1.40 Specifications", 2012, 1 page.

MIPI Alliance, "MIPI Alliance launches New M-PHY and UniPro Specifications for Mobile Device Application", Jun. 10, 2011, 2 pages.

Office Action issued in U.S. Appl. No. 13/477,322 mailed Aug. 7, 2012.

"Smartphone is next stop for PCI Express" from www.eetimes.com; published Sep. 13, 2012; 2 pages.

"Spec turns USB3 into chip link" from www.eetimes.com; published May 3, 2011; 2 pages.

"M-PHY benefits and challenges" from www.eetimes.com; published Apr. 11, 2011; 8 pages.

"PCIe Over M-PHY May Bring High-Speed I/O to Tables, Smartphones" from www.pcmag.com; published Sep. 13, 2012.

Notice of Allowance received for Taiwanese Patent Application No. 103107445, dated Nov. 27, 2015, with 5 pages of the allowed English claims.

* cited by examiner

DYNAMIC RESPONSE IMPROVEMENT OF HYBRID POWER BOOST TECHNOLOGY

FIELD

The present disclosure generally relates to the field of electronics. More particularly, an embodiment of the invention relates to improving dynamic response of hybrid power boost technology.

BACKGROUND

To improve performance, some processors may use a "turbo" mode. For example, turbo mode may allow a processor to increase its frequency to meet workload demands when there is a thermal margin available on the platform. The level of power consumption by the processor in this case may drastically exceed the thermal design levels, and the total platform consumption may also exceed a power adapter's capability.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

DETAILED DESCRIPTION

Figure 1:
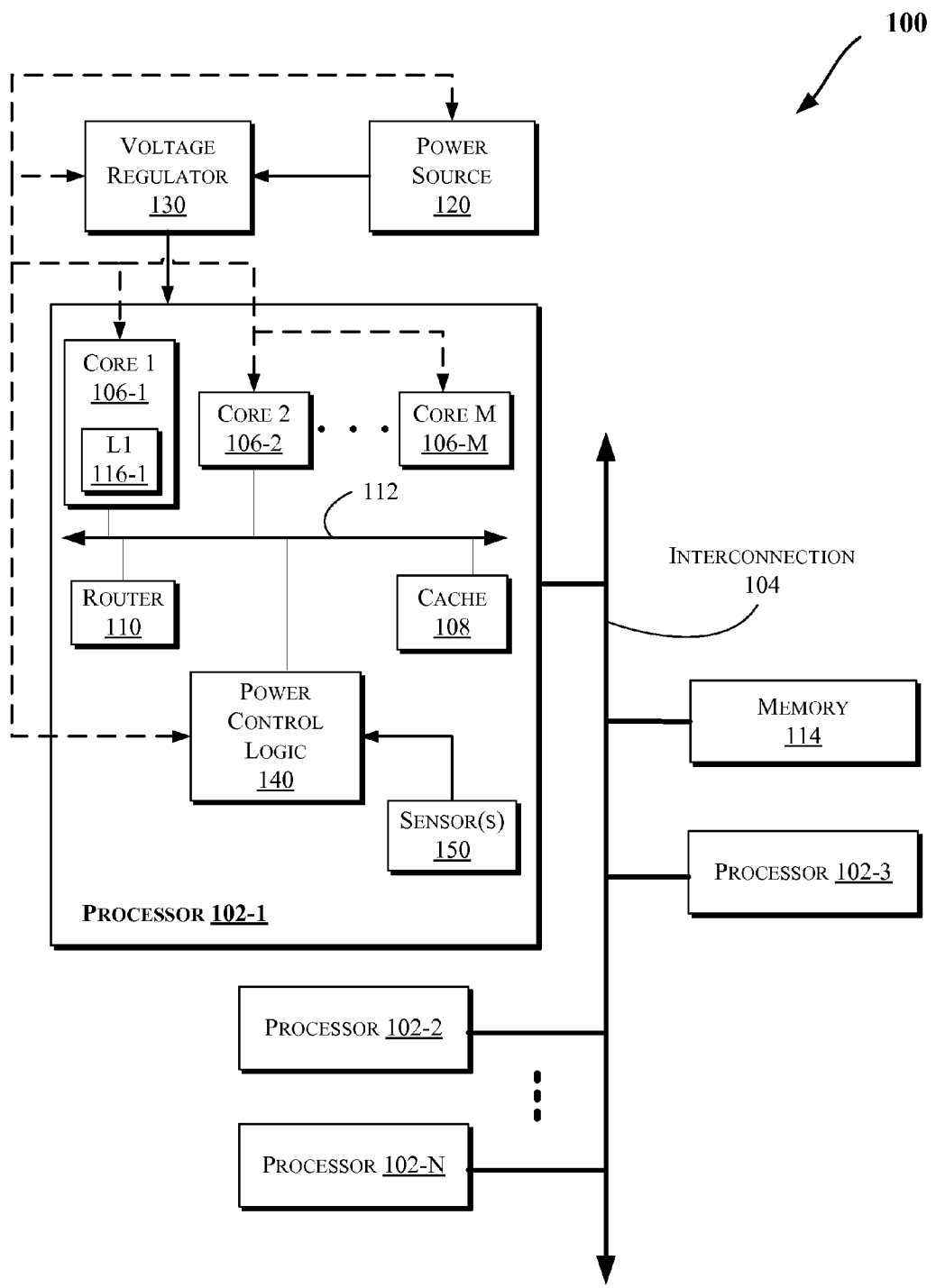
FIGS. 1 and 5-7 illustrate block diagrams of embodiments of computing systems, which may be utilized to implement various embodiments discussed herein.

In the following description, numerous specific details are set forth in order to provide a thorough understanding of various embodiments. However, various embodiments of the invention may be practiced without the specific details. In other instances, well-known methods, procedures, components, and circuits have not been described in detail so as not to obscure the particular embodiments of the invention. Further, various aspects of embodiments of the invention may be performed using various means, such as integrated semiconductor circuits ("hardware"), computer-readable instructions organized into one or more programs ("software"), or some combination of hardware and software. For the purposes of this disclosure reference to "logic" shall mean either hardware, software, or some combination thereof.

In order to support dynamic boost mode (where "boost" may also be referred to as "turbo"), some implementations may implement a hybrid power boost mechanism, which allows the battery to supplement the AC (Alternating Current) power adapter when the system power consumption exceeds the adapter's power capability. However, the amount of time for charger to switch from charging a battery to boosting to support hybrid power boost may be unacceptable in some implementations to the AC adapter or any other primary source of energy to the mobile platform. For example, it may take about 1 ms for the charger to switch to the boost mode when the adapter over-current is detected. While this delay may be sufficient for some, it may prove to be exceedingly long as the turbo levels are increased, while the thermal design levels may be decreased at the same time. Also, if the transition delay exceeds the time constant of the AC adapter (or alternative power source) over-current protection, then the adapter may shut down before the charger is capable of supplementing the adapter power by the battery power. Hence, the actual time for charge-to-boost transition needs to decreased to meet the increasing performance demands as well as decreased thermal design levels. The same logic applies to the Narrow VDC (NVDC) systems, where the battery is always connected to the system.

To this end, some embodiments improve the dynamic response of hybrid power boost technology or NVDC technology (e.g., by reducing the transition time required for a charge-to-boost transition). As discussed herein, a "boost" mode or refers to a technology that increases processor (or one or more processor cores) performance by increasing the processor/core(s) operating frequency (this mode may be also used by other types of electronic equipment). In an embodiment, two or more levels of adapter over-current are used for AC adapters/chargers (additional batteries or other power sources) during transition from charging (e.g., one or more battery packs such as those discussed with reference to FIG. 2) to boosting platform performance (e.g., via increasing the operating frequency of one or more processor cores of a processor such as those discussed with reference to FIGS. 1, 5-7). As discussed herein, the terms "adapter" and "charger" may be used interchangeably. In another embodiment, an adapter's voltage level is used as a trigger for fast transition from charging to boosting. For example a sudden droop in the system voltage may be a signal to the charger to supplement the adapter power with the power supplied by the battery. Moreover, the aforementioned two embodiments may be used together to provide better support for hybrid power boost or NVDC and also to potentially prevent the adapter from prematurely shutting down (e.g., due to very high turbo current spikes which can also lead to user/customer dissatisfaction).

Moreover, some embodiments may be applied in computing systems that include one or more processors (e.g., with one or more processor cores), such as those discussed with reference to FIGS. 1-7 including, for example used in laptops, mobile devices, ultrabooks, tablets, Smartphones, etc. More particularly, FIG. 1 illustrates a block diagram of a computing system 100, according to an embodiment of the invention. The system 100 may include one or more processors 102-1 through 102-N (generally referred to herein as "processors 102" or "processor 102"). The processors 102 may communicate via an interconnection or bus 104. Each processor may include various components some of which are only discussed with reference to processor 102-1 for clarity. Accordingly, each of the remaining processors 102-2 through 102-N may include the same or similar components discussed with reference to the processor 102-1.

In an embodiment, the processor 102-1 may include one or more processor cores 106-1 through 106-M (referred to herein as "cores 106," or "core 106"), a cache 108, and/or a router 110. The processor cores 106 may be implemented on a single integrated circuit (IC) chip. Moreover, the chip may include one or more shared and/or private caches (such as cache 108), buses or interconnections (such as a bus or interconnection 112), graphics and/or memory controllers (such as those discussed with reference to FIGS. 5-7), or other components.

In one embodiment, the router 110 may be used to communicate between various components of the processor 102-1 and/or system 100. Moreover, the processor 102-1 may include more than one router 110. Furthermore, the multitude of routers 110 may be in communication to enable data routing between various components inside or outside of the processor 102-1.

The cache 108 may store data (e.g., including instructions) that are utilized by one or more components of the processor 102-1, such as the cores 106. For example, the cache 108 may locally cache data stored in a memory 114 for faster access by the components of the processor 102 (e.g., faster access by cores 106). As shown in FIG. 1, the memory 114 may communicate with the processors 102 via the interconnection 104. In an embodiment, the cache 108 (that may be shared) may be a mid-level cache (MLC), a last level cache (LLC), etc. Also, each of the cores 106 may include a level 1 (L1) cache (116-1) (generally referred to herein as "L1 cache 116") or other levels of cache such as a level 2 (L2) cache. Moreover, various components of the processor 102-1 may communicate with the cache 108 directly, through a bus (e.g., the bus 112), and/or a memory controller or hub.

The system 100 may also include a platform power source 120 (e.g., a direct current (DC) power source or an alternating current (AC) power source) to provide power to one or more components of the system 100. In some embodiments, the power source 120 may include one or more battery packs and/or power supplies. The power source 120 may be coupled to components of system 100 through a voltage regulator (VR) 130. Moreover, even though FIG. 1 illustrates one power source 120 and one voltage regulator 130, additional power sources and/or voltage regulators may be utilized. For example, one or more of the processors 102 may have corresponding voltage regulator(s) and/or power source(s). Also, the voltage regulator(s) 130 may be coupled to the processor 102 via a single power plane (e.g., supplying power to all the cores 106) or multiple power planes (e.g., where each power plane may supply power to a different core or group of cores).

Additionally, while FIG. 1 illustrates the power source 120 and the voltage regulator 130 as separate components, the power source 120 and the voltage regulator 130 may be incorporated into other components of system 100. For example, all or portions of the VR 130 may be incorporated into the power source 120 and/or processor 102.

As shown in FIG. 1, the processor 102 may further include a power control logic 140 to control supply of power to components of the processor 102 (e.g., cores 106). Logic 140 may have access to one or more storage devices discussed herein (such as cache 108, L1 cache 116, memory 114, or another memory in system 100) to store information relating to operations of logic 140 such as information communicated with various components of system 100 as discussed here. As shown, the logic 140 may be coupled to the VR 130 and/or other components of system 100 such as the cores 106 and/or the power source 120.

For example, the logic 140 may be coupled to receive information (e.g., in the form of one or more bits or signals) to indicate status of one or more sensors 150. The sensor(s) 150 may be provided proximate to component(s) of system 100 (or other computing systems discussed herein such as those discussed with reference to other figures including 5-7, for example), such as the cores 106, interconnections 104 or 112, components outside of the processor 102, etc., to sense variations in various factors affecting power/thermal behavior of the system/platform, such as temperature, operating frequency, operating current, operating voltage, power consumption, and/or inter-core communication activity, overcurrent, etc.

The logic 140 may in turn instruct the VR 130, power source 120, and/or individual components of system 100 (such as the cores 106) to modify their operations. For example, logic 140 may indicate to the VR 130 and/or power source 120 to adjust their output. In some embodiments, logic 140 may request the cores 106 to modify their operating frequency, operating current, power consumption, etc. Also, even though components 140 and 150 are shown to be included in processor 102-1, these components may be provided elsewhere in the system 100. For example, power control logic 140 may be provided in the VR 130, in the power source 120, directly coupled to the interconnection 104, within one or more (or alternatively all) of the processors 102, etc. Furthermore, as shown in FIG. 1, the power source 120 and/or the voltage regulator 130 may communicate with the power control logic 140, e.g., to report their power related specifications and/or status.

Figure 2:
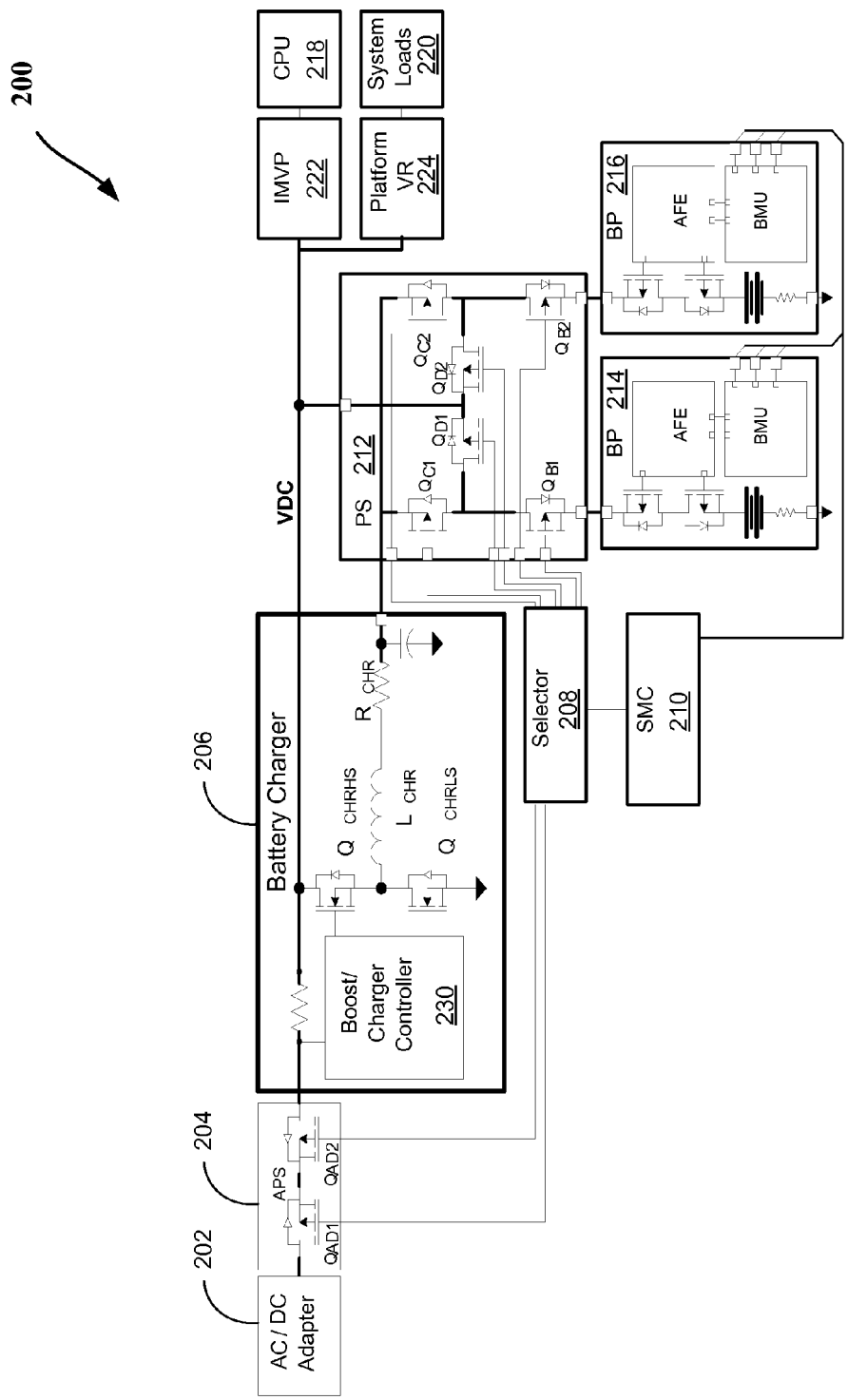
FIG. 2 illustrates a block diagram of a platform power system, according to an embodiment.

FIG. 2 illustrates a block diagram of a platform power system 200, according to an embodiment. System 200 is an adaptor-battery-charger power system with a boost mode capability for a computing platform.

As shown in FIG. 2, system 200 generally includes an AC/DC adapter 202 (which may be the same or similar to power source 120 of FIG. 1), Adapter Protection Switches (APS) 204, battery charger 206, selector 208, system management controller (SMC) 210, power switch (PS) network 212, and battery packs 214, 216, which may be coupled together as shown in some embodiments. As used herein, the term computing "platform" refers to any processor based device amenable to the principles presented herein including but not limited to a laptop, a netbook, a tablet, Ultrabook or a cellular/smart phone, although a portable personal computer such as a so-called notebook personal computer may be used as a primary example for purposes of describing the technologies presented herein. It should be appreciated that the depicted power system blocks may be incorporated, in whole or in part, in the computing platform and in fact, in some embodiments, the components, apart from the adapter, are part of the platform for providing power to the platform load which may include a CPU/processor 218 and/or other system loads 220, e.g., the various parts of the computing platform such as display, cooling system, etc. (such as the components show with reference to systems of FIGS. 1 and 5-7), make up the system loads 220. Further, the CPU 218 are coupled to receive power via an IMVP (Intel® Mobile Voltage Positioning) logic 222 and the system loads 220 are coupled to receive power via a platform VR 224 (which may be the same or similar to the VR 130 of FIG. 1) in some embodiments.

As shown, the adapter 202 is coupled to the platform through two protection switches $Q_{AD1}$ and $Q_{AD2}$ within the APS 204. The adapter provides a DC supply voltage to the platform, which then converts it, as may be internally needed within the platform, using one or more DC-to-DC converters within the platform. As an example, for platforms such as tablets, netbooks or notebook portable computing platforms, an adapter may provide a DC supply of about 19 to 20 VDC directly to the computing platform (some systems may use the DC supply of much lower voltage). On the other hand, the battery packs may provide a lower supply voltage, e.g., from 9 to 12 VDC with the present example (actual systems may use lower or higher voltage). The platform may be capable of receiving a wide range of input supply voltages (e.g., higher voltages from adapters and lower voltages from the battery packs) and converting them to suitable internal levels. In some cases, the platform steps down both the adapter and the battery supplies to levels, e.g., ranging from less than 1.0 V to 5 VDC.

The battery charger 206 provides power from the adapter 202 to the battery packs 214/216, when the adapter is available. Since, as just discussed, the adapter's output voltage may be greater than the supplies from the battery packs, the battery charger may include a step-down DC-DC converter to convert the higher adapter voltage (e.g., 19-20 V) to the lower battery voltage (e.g., 9-12 V). In the depicted figure, the battery charger 206 comprises a synchronous buck-type converter formed from switches $Q_{CHRHS}/Q_{CHRLS}$, inductor $L_{CHR}$ (with series resistance indicated as $R_{CHR}$) and capacitor C, coupled together.

The selector 208, which may be controlled by the SMC 210, controls various power switches including those in the power switch network 212 for coupling the appropriate battery pack to the charger 206 and/or to the platform loads (e.g., through IMVP and platform VR). It also may control the APS 204 for coupling the adapter to the platform load. When the adapter 202 is disconnected, a battery pack, 214/216, provides full platform power through switches $Q_{D1}$ or $Q_{D2}$ within the PS 212. Note that there may also be an embedded power controller, not shown, for managing overall platform power, as well as possibly other environmental parameters.

With computing platforms, at times (e.g., when operating temperatures are sufficiently low) for some platform components (e.g., one or more processor cores and/or graphic processors), these components may be driven to higher performance modes. For example, during such modes (herein referred to as "boost" or "turbo" modes), one or more components may be driven harder for periods ranging, e.g., from hundreds of microseconds to tens of seconds. Unfortunately, this may require larger amounts of power than the adapter is capable of reliably providing. Accordingly, disclosed herein are approaches involving using both the adapter and the battery (or other energy storage devices or a combination of energy storage devices) at the same time to provide power to the platform during such boost modes. Such a mode of operation can be allowed if the system confirms that the battery is charged to sufficient levels to support it.

Furthermore, a battery charger controller 230 (which may be the same or similar to (or at least partially included in) logic 140 of FIG. 1) is configured to control the charger converter components to operate in both buck (step down charge) and boost (step up, power boost) modes. Also, other blocks may be modified and/or augmented to facilitate particular design considerations.

Figure 3:
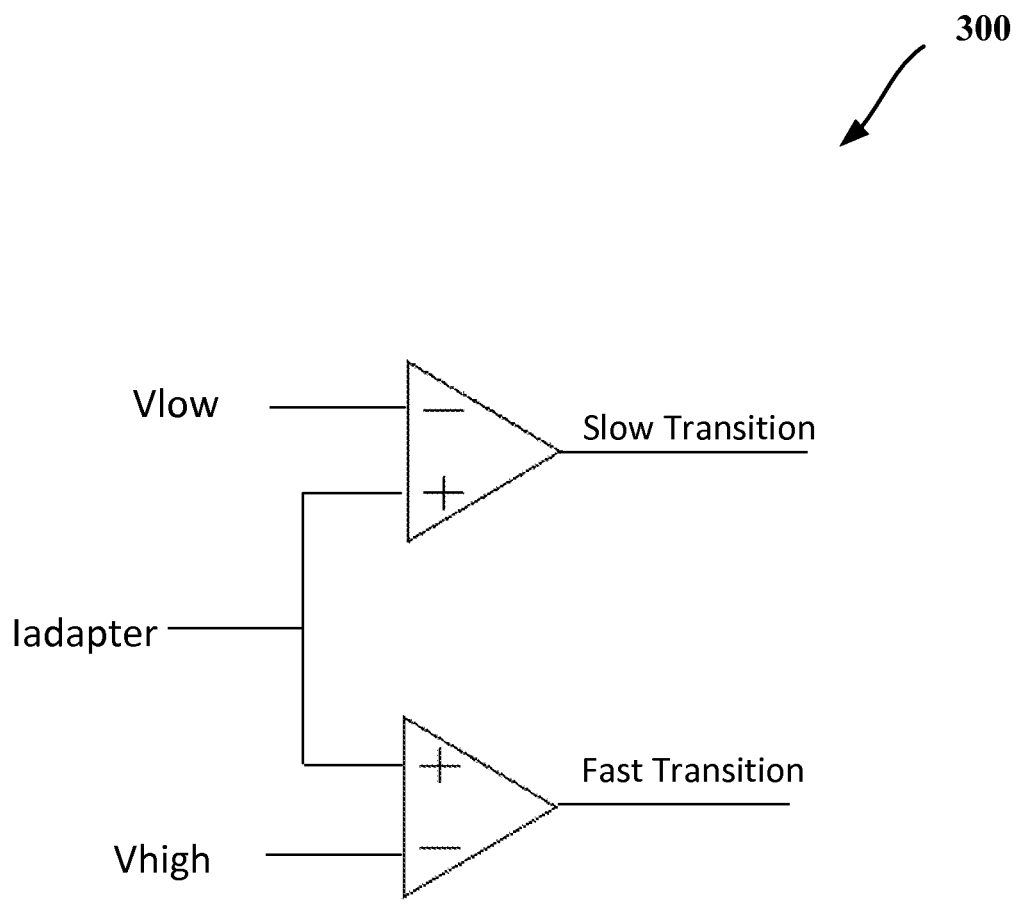
FIG. 3 illustrates a circuit diagram for slow and fast transition modes, according to some embodiments.

FIG. 3 illustrates a simplified circuit diagram for slow and fast transition modes, according to some embodiments. As shown, two comparators are used to generate a slow transition signal and a high transition signal. As shown, the slow transition signal is generated based on comparison of a low Voltage value (labeled $V_{low}$ in FIG. 3) and an adapter current value (labeled as $I_{adapter}$ in FIG. 3). Also, the fast transition signal is generated based on comparison of a high Voltage value (labeled $V_{high}$ in FIG. 3) and the adapter current value ($I_{adapter}$). The comparator circuits may be much more complex and include dedicated filtering and time delays.

Figure 4:
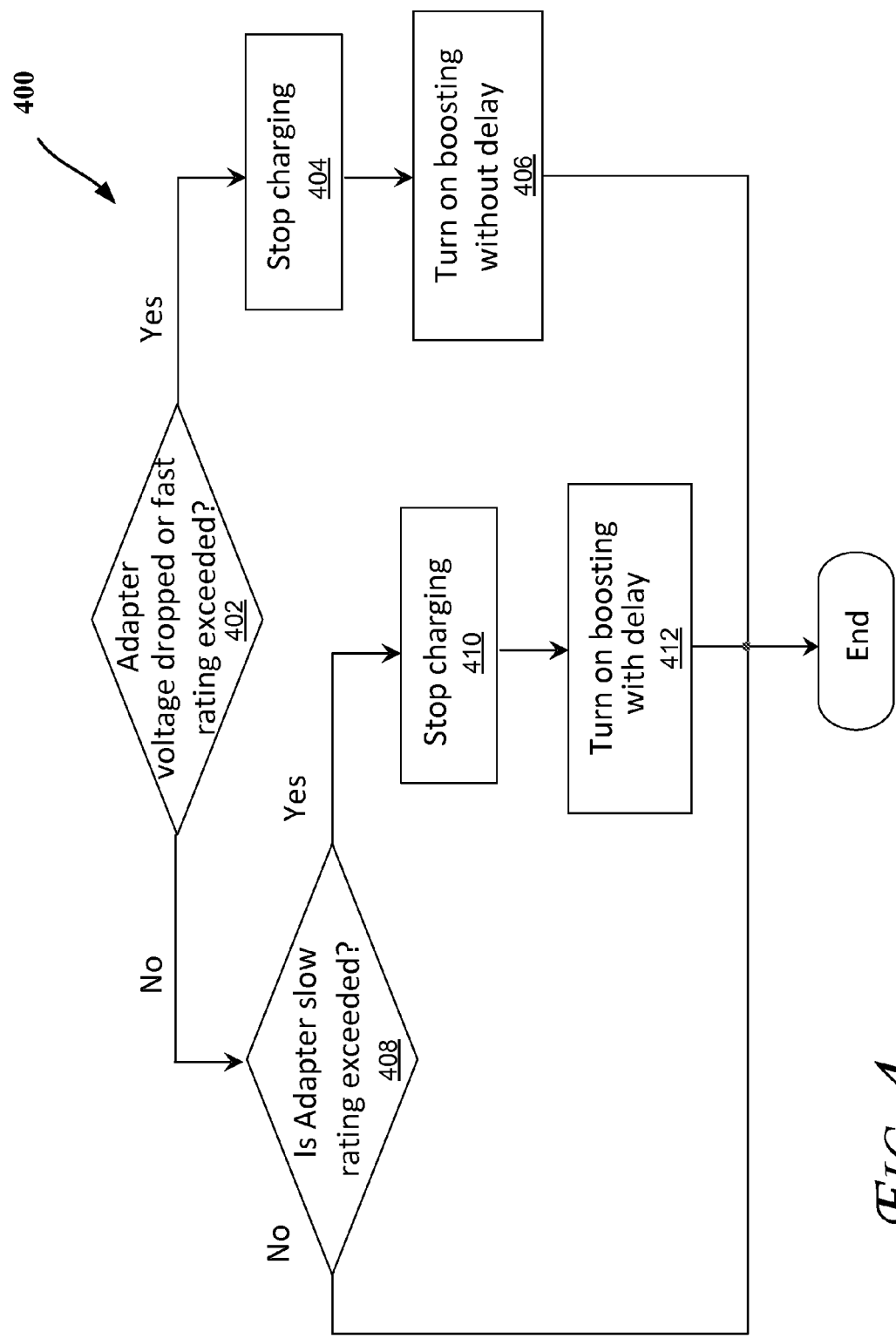
FIG. 4 illustrates a flow diagram according to some embodiments.

FIG. 4 illustrates a flow diagram of a method 400 for improving dynamic response of hybrid power boost technology, according to some embodiments. In an embodiment, various components (including for example logic 140) discussed with reference to FIGS. 1-3 and 5-7 may be utilized to perform one or more of the operations discussed with reference to FIG. 4.

In an embodiment, two or more levels of adapter over-current are used for AC adapters/chargers during transition from charging to boosting. Moreover, the AC adapter can sustain some level of over-current (e.g., for more than 1ms) for a great majority of users. On the other hand, if the level of over-current is too high, then the OCP (Over Current Protection) will be asserted much faster. One way to use this technique is shown in FIG. 3. More specifically, the charger controller will have two levels of adapter current: (1) Level 1 (Slow): adapter rated current; and (2) Level 2 (Fast): adapter fast OCP current. Accordingly, two or more distinct levels of adapter OCP may be set in the charger (or reported to the charger by the individual adapter) and used during the transition from charging to boosting. In an embodiment, the chargers supporting hybrid power boost will be able to support fast transitions from charging to boosting without the need to stop the charging for low levels of over-current which last short durations and can be ignored.

Referring to FIGS. 1-4, when the adapter current exceeds the fast OCP of the adapter at operation 402, the charger stops charging at an operation 404 and immediately turns on the hybrid power boost function at operation 406 (e.g., supplementing the adapter power with battery power). If the adapter current level exceeds the slow adapter OCP at operation 408, then the charger will stop charging at an operation 410. At an operation 412, the adapter will turn on the hybrid power boost function after a pre-determined delay that may be determined based on expiration of a timer (e.g., supplementing the adapter power with battery power). The same can be achieved if the input to the slow comparator has sufficient filtering to provide a necessary delay and exclude the short-duration spikes.

In another embodiment, an adapter's voltage level is used as a trigger for fast transition from charging to boosting. This technique accelerates the hybrid power boost for high dynamic transients based on the charger monitoring the adapter output voltage (the voltage may be already monitored by the charger for other needs).

Referring to FIGS. 1-4, at operation 402, if the adapter voltage drops below a preset/threshold value, then it becomes evident that the adapter is being protected from the over-current (this may be due to relatively low time duration for the adapter OCP or low OCP level for a particular sample of the adapter), and the hybrid power boost function needs to be immediately turned on at operation 406 (e.g., after stopping charging). In an embodiment, if the voltage continues to drop even when the adapter current is within the OCP limits, then it means the consumer/user is disconnecting the adapter, and it is necessary to turn off the boost function, and switch to a battery mode of operation (this will happen when adapter voltage drops below the under-voltage level). Otherwise, if the adapter voltage is not dropping and fast rating is not exceeded at operation 402, method 400 continues with operation 408 as discussed above.

Moreover, the aforementioned embodiments (that utilize two or more over-current levels and adapter voltage drop to transition from charge to boost) may be used together to provide better support for hybrid power boost and also to potentially prevent the adapter (or other primary source) from prematurely shutting down (e.g., due to very high turbo current spikes which can also lead to user/customer dissatisfaction).

Figure 5:
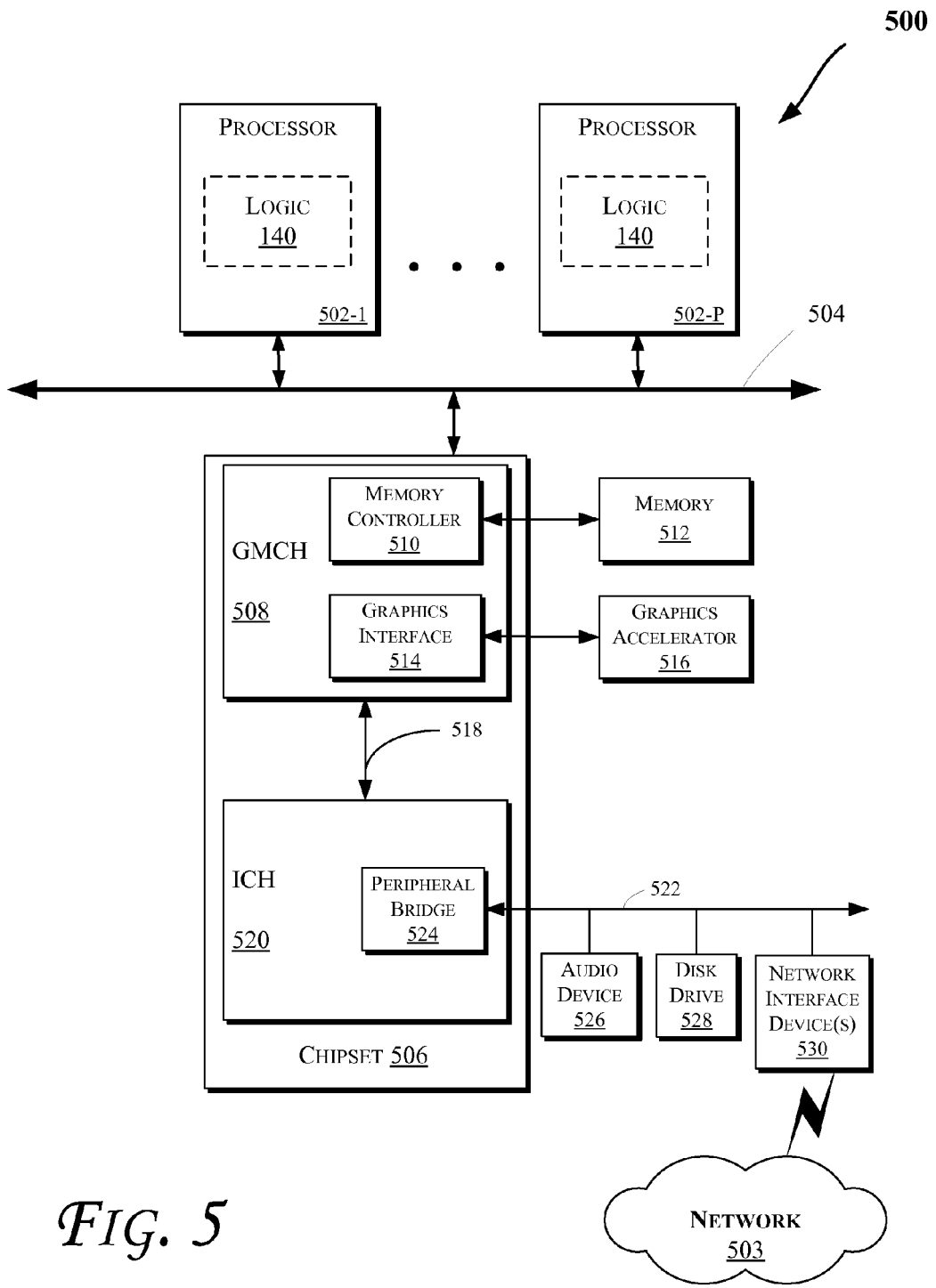

FIG. 5 illustrates a block diagram of a computing system 500 in accordance with an embodiment of the invention. The computing system 500 may include one or more central processing unit(s) (CPUs) or processors 502-1 through 502-P (which may be referred to herein as "processors 502" or "processor 502"). The processors 502 may communicate via an interconnection network (or bus) 504. The processors 502 may include a general purpose processor, a network processor (that processes data communicated over a computer network 503), or other types of a processor (including a reduced instruction set computer (RISC) processor or a complex instruction set computer (CISC)).

Moreover, the processors 502 may have a single or multiple core design. The processors 502 with a multiple core design may integrate different types of processor cores on the same integrated circuit (IC) die. Also, the processors 502 with a multiple core design may be implemented as symmetrical or asymmetrical multiprocessors. In an embodiment, one or more of the processors 502 may be the same or similar to the processors 102 of FIG. 1. In some embodiments, one or more of the processors 502 may include one or more of the cores 106, logic 140, and sensor(s) 150, of FIG. 1. Also, the operations discussed with reference to FIGS. 1-4 may be performed by one or more components of the system 500. For example, a voltage regulator (such as VR 130 of FIG. 1) may regulate voltage supplied to one or more components of FIG. 5 at the direction of logic 140 (which may also control boost mode initiation).

A chipset 506 may also communicate with the interconnection network 504. The chipset 506 may include a graphics and memory control hub (GMCH) 508. The GMCH 508 may include a memory controller 510 that communicates with a memory 512. The memory 512 may store data, including sequences of instructions that are executed by the processor 502, or any other device included in the computing system 500. In one embodiment of the invention, the memory 512 may include one or more volatile storage (or memory) devices such as random access memory (RAM), dynamic RAM (DRAM), synchronous DRAM (SDRAM), static RAM (SRAM), or other types of storage devices. Nonvolatile memory may also be utilized such as a hard disk. Additional devices may communicate via the interconnection network 504, such as multiple CPUs and/or multiple system memories.

The GMCH 508 may also include a graphics interface 514 that communicates with a graphics accelerator 516. In one embodiment of the invention, the graphics interface 514 may communicate with the graphics accelerator 516 via an accelerated graphics port (AGP). In an embodiment of the invention, a display (such as a flat panel display, a cathode ray tube (CRT), a projection screen, etc.) may communicate with the graphics interface 514 through, for example, a signal converter that translates a digital representation of an image stored in a storage device such as video memory or system memory into display signals that are interpreted and displayed by the display. The display signals produced by the display device may pass through various control devices before being interpreted by and subsequently displayed on the display.

A hub interface 518 may allow the GMCH 508 and an input/output control hub (ICH) 520 to communicate. The ICH 520 may provide an interface to I/O devices that communicate with the computing system 500. The ICH 520 may communicate with a bus 522 through a peripheral bridge (or controller) 524, such as a peripheral component interconnect (PCI) bridge, a universal serial bus (USB) controller, or other types of peripheral bridges or controllers. The bridge 524 may provide a data path between the processor 502 and peripheral devices. Other types of topologies may be utilized. Also, multiple buses may communicate with the ICH 520, e.g., through multiple bridges or controllers. Moreover, other peripherals in communication with the ICH 520 may include, in various embodiments of the invention, integrated drive electronics (IDE) or small computer system interface (SCSI) hard drive(s), USB port(s), a keyboard, a mouse, parallel port(s), serial port(s), floppy disk drive(s), digital output support (e.g., digital video interface (DVI)), or other devices.

The bus 522 may communicate with an audio device 526, one or more disk drive(s) 528, and one or more network interface device(s) 530 (which is in communication with the computer network 503). Other devices may communicate via the bus 522. Also, various components (such as the network interface device 530) may communicate with the GMCH 508 in some embodiments of the invention. In addition, the processor 502 and the GMCH 508 may be combined to form a single chip. Furthermore, the graphics accelerator 516 may be included within the GMCH 508 in other embodiments of the invention.

Furthermore, the computing system 500 may include volatile and/or nonvolatile memory (or storage). For example, nonvolatile memory may include one or more of the following: read-only memory (ROM), programmable ROM (PROM), erasable PROM (EPROM), electrically EPROM (EEPROM), a disk drive (e.g., 528), a floppy disk, a compact disk ROM (CD-ROM), a digital versatile disk (DVD), flash memory, a magneto-optical disk, or other types of nonvolatile machine-readable media that are capable of storing electronic data (e.g., including instructions). In an embodiment, components of the system 500 may be arranged in a point-to-point (PtP) configuration. For example, processors, memory, and/or input/output devices may be interconnected by a number of point-to-point interfaces.

Figure 6:
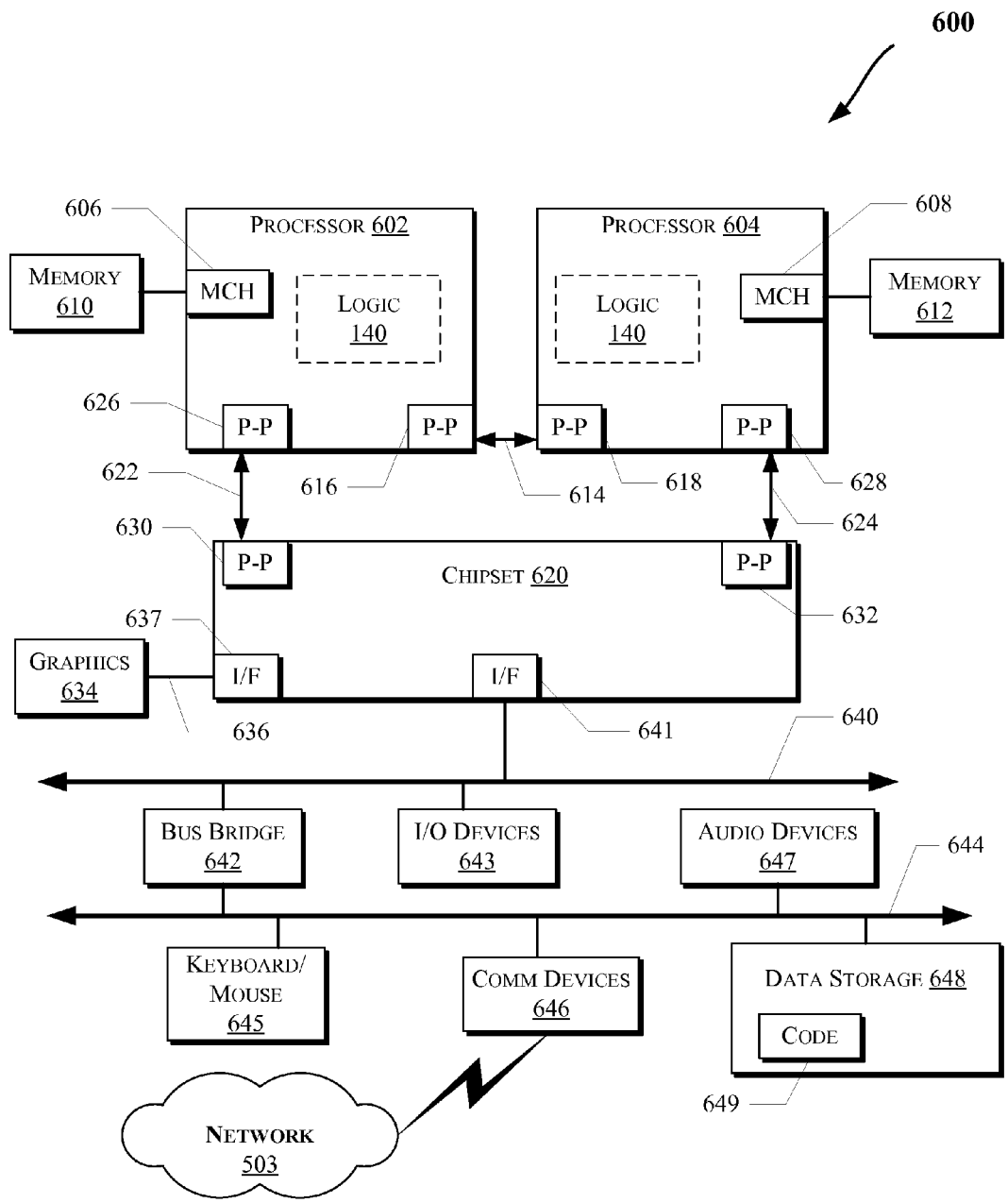

FIG. 6 illustrates a computing system 600 that is arranged in a point-to-point (PtP) configuration, according to an embodiment of the invention. In particular, FIG. 6 shows a system where processors, memory, and input/output devices are interconnected by a number of point-to-point interfaces. The operations discussed with reference to FIGS. 1-5 may be performed by one or more components of the system 600. For example, a voltage regulator (such as VR 130 of FIG. 1) may regulate voltage supplied to one or more components of FIG. 6 at the direction of logic 140 (which may also control boost mode initiation).

As illustrated in FIG. 6, the system 600 may include several processors, of which only two, processors 602 and 604 are shown for clarity. The processors 602 and 604 may each include a local memory controller hub (MCH) 606 and 608 to enable communication with memories 610 and 612. The memories 610 and/or 612 may store various data such as those discussed with reference to the memory 512 of FIG. 5. Also, the processors 602 and 604 may include one or more of the cores 106, logic 140, and/or sensor(s) 150 of FIG. 1.

In an embodiment, the processors 602 and 604 may be one of the processors 502 discussed with reference to FIG. 5. The processors 602 and 604 may exchange data via a point-to-point (PtP) interface 614 using PtP interface circuits 616 and 618, respectively. Also, the processors 602 and 604 may each exchange data with a chipset 620 via individual PtP interfaces 622 and 624 using point-to-point interface circuits 626, 628, 630, and 632. The chipset 620 may further exchange data with a high-performance graphics circuit 634 via a high-performance graphics interface 636, e.g., using a PtP interface circuit 637.

In at least one embodiment, one or more operations discussed with reference to FIGS. 1-6 may be performed by the processors 602 or 604 and/or other components of the system 600 such as those communicating via a bus 640. Other embodiments of the invention, however, may exist in other circuits, logic units, or devices within the system 600 of FIG. 6. Furthermore, some embodiments of the invention may be distributed throughout several circuits, logic units, or devices illustrated in FIG. 6.

Chipset 620 may communicate with the bus 640 using a PtP interface circuit 641. The bus 640 may have one or more devices that communicate with it, such as a bus bridge 642 and I/O devices 643. Via a bus 644, the bus bridge 642 may communicate with other devices such as a keyboard/mouse 645, communication devices 646 (such as modems, network interface devices, or other communication devices that may communicate with the computer network 503), audio I/O device, and/or a data storage device 648. The data storage device 648 may store code 649 that may be executed by the processors 602 and/or 604.

Figure 7:
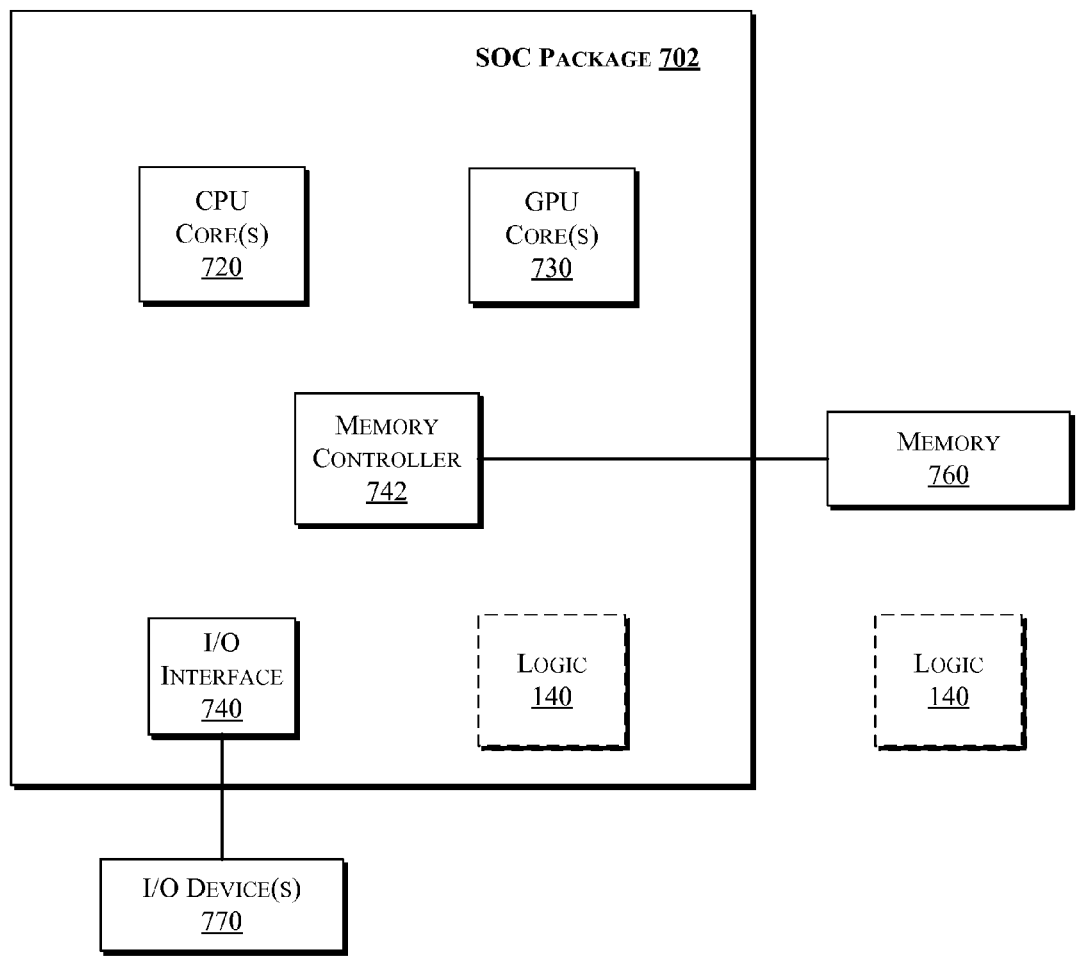

In some embodiments, one or more of the components discussed herein can be embodied as a System On Chip (SOC) device. FIG. 7 illustrates a block diagram of an SOC package in accordance with an embodiment. As illustrated in FIG. 7, SOC 702 includes one or more Central Processing Unit (CPU) cores 720, one or more Graphics Processor Unit (GPU) cores 730, an Input/Output (I/O) interface 740, and a memory controller 742. Various components of the SOC package 702 may be coupled to an interconnect or bus such as discussed herein with reference to the other figures. Also, the SOC package 702 may include more or less components, such as those discussed herein with reference to the other figures. Further, each component of the SOC package 720 may include one or more other components, e.g., as discussed with reference to the other figures herein. In one embodiment, SOC package 702 (and its components) is provided on one or more Integrated Circuit (IC) die, e.g., which are packaged into a single semiconductor device.

As illustrated in FIG. 7, SOC package 702 is coupled to a memory 760 (which may be similar to or the same as memory discussed herein with reference to the other figures) via the memory controller 742. In an embodiment, the memory 760 (or a portion of it) can be integrated on the SOC package 702.

The I/O interface 740 may be coupled to one or more I/O devices 770, e.g., via an interconnect and/or bus such as discussed herein with reference to other figures. I/O device(s) 770 may include one or more of a keyboard, a mouse, a touchpad, a display, an image/video capture device (such as a camera or camcorder/video recorder), a touch screen, a speaker, or the like. Furthermore, SOC package 702 may include/integrate the logic 140 in an embodiment. Alternatively, the logic 140 may be provided outside of the SOC package 702 (i.e., as a discrete logic).

The following examples pertain to further embodiments. Example 1 includes an apparatus comprising: logic, at least a portion of which is in hardware, to cause modification to performance of one or more processor cores of a processor based on at least two levels of over-current for a charger, wherein the charger is to transition from charging one or more battery packs to boosting the performance of at least one of the one or more processor cores of the processor in response to exceeding one of the at least two over-current levels for the charger. Example 2 includes the apparatus of example 1, wherein the at least two levels of over-current are to comprise a slow over-current level for the charger and a fast over-current level for the charger. Example 3 includes the apparatus of example 2, wherein the charger is to transition from charging at least one of the one or more battery packs to boosting the performance of at least one of the one or more processor cores of the processor in response to exceeding the fast over-current level without delay. Example 4 includes the apparatus of example 2, wherein the charger is to transition from charging at least one of the one or more battery packs to boosting the performance of at least one of the one or more processor cores of the processor in response to exceeding the slow over-current level after a delay. Example 5 includes the apparatus of example 1, further comprising one or more sensors to detect variations in one or more of: temperature, operating frequency, operating voltage, and power consumption. Example 6 includes the apparatus of example 1, wherein one or more of: the logic, the one or more processor cores of the processor, and memory are on a single integrated circuit. Example 7 includes the apparatus of example 1, wherein the charger is to transition from charging one or more battery packs to boosting the performance of at least one of the one or more processor cores of the processor in response to an output voltage level of the charger exceeding a threshold value.

Example 8 includes an apparatus comprising: logic, at least a portion of which is in hardware, to cause modification to performance of one or more processor cores of a processor based on comparison of an output voltage level of a charger and a threshold value, wherein the charger is to transition from charging one or more battery packs to boosting the performance of at least one of the one or more processor cores of the processor in response to the comparison of the output voltage level of the charger to the threshold value. Example 9 includes the apparatus of example 8, wherein the charger is to transition from charging at least one of the one or more battery packs to boosting the performance of at least one of the one or more processor cores of the processor in response to exceeding the threshold value and without delay. Example 10 includes the apparatus of example 8, wherein the charger is to transition from charging at least one of the one or more battery packs to boosting the performance of at least one of the one or more processor cores of the processor in response to exceeding a fast over-current level for the charger. Example 11 includes the apparatus of example 8, wherein the charger is to transition from charging at least one of the one or more battery packs to boosting the performance of at least one of the one or more processor cores of the processor in response to exceeding a slow over-current level for the charger. Example 12 includes the apparatus of example 8, further comprising one or more sensors to detect variations in one or more of: temperature, operating frequency, operating voltage, and power consumption. Example 13 includes the apparatus of example 8, wherein one or more of: the logic, the one or more processor cores of the processor, and memory are on a single integrated circuit.

Example 14 includes a method comprising: causing modification to performance of one or more processor cores of a processor based on at least two levels of over-current for a charger, wherein the charger transitions from charging one or more battery packs to boosting the performance of at least one of the one or more processor cores of the processor in response to exceeding one of the at least two over-current levels for the charger. Example 15 includes the method of example 14, wherein the at least two levels of over-current are to comprise a slow over-current level for the charger and a fast over-current level for the charger. Example 16 includes the method of example 15, further comprising the charger transitioning from charging at least one of the one or more battery packs to boosting the performance of at least one of the one or more processor cores of the processor in response to exceeding the fast over-current level without delay. Example 17 includes the method of example 15, further comprising the charger transitioning from charging at least one of the one or more battery packs to boosting the performance of at least one of the one or more processor cores of the processor in response to exceeding the slow over-current level after a delay. Example 18 includes the method of example 14, further comprising one or more sensors detecting variations in one or more of: temperature, operating frequency, operating voltage, and power consumption. Example 19 includes the method of example 14, further comprising the charger transitioning from charging one or more battery packs to boosting the performance of at least one of the one or more processor cores of the processor in response to an output voltage level of the charger exceeding a threshold value.

Example 20 includes a method comprising: causing modification to performance of one or more processor cores of a processor based on comparison of an output voltage level of a charger and a threshold value, wherein the charger transitions from charging one or more battery packs to boosting the performance of at least one of the one or more processor cores of the processor in response to the comparison of the output voltage level of the charger to the threshold value. Example 21 includes the method of example 20, further comprising the charger transitioning from charging at least one of the one or more battery packs to boosting the performance of at least one of the one or more processor cores of the processor in response to exceeding the threshold value and without delay. Example 22 includes the method of example 20, further comprising the charger transitioning from charging at least one of the one or more battery packs to boosting the performance of at least one of the one or more processor cores of the processor in response to exceeding a fast over-current level for the charger. Example 23 includes the method of example 20, further comprising the charger transitioning from charging at least one of the one or more battery packs to boosting the performance of at least one of the one or more processor cores of the processor in response to exceeding a slow over-current level for the charger. Example 24 includes the method of example 20, further comprising one or more sensors detecting variations in one or more of: temperature, operating frequency, operating voltage, and power consumption.

Example 25 includes a system comprising: a processor having one or more processor cores; logic, at least a portion of which is in hardware, to cause modification to performance of at least one of the one or more processor cores of the processor based on one or more of: at least two levels of over-current for a charger and comparison of an output voltage level of the charger and a threshold value; and one or more battery packs, wherein the charger is to transition from charging at least one of the one or more battery packs to boosting the performance of at least one of the one or more processor cores of the processor in response to one or more of: exceeding one of the at least two over-current levels for the charger and the output voltage level of the charger exceeding the threshold value. Example 26 includes the system of example 25, wherein the at least two levels of over-current are to comprise a slow over-current level for the charger and a fast over-current level for the charger. Example 27 includes the system of example 26, wherein the charger is to transition from charging at least one of the one or more battery packs to boosting the performance of at least one of the one or more processor cores of the processor in response to exceeding the fast over-current level without delay. Example 28 includes the system of example 26, wherein the charger is to transition from charging at least one of the one or more battery packs to boosting the performance of at least one of the one or more processor cores of the processor in response to exceeding the slow over-current level after a delay. Example 29 includes the system of example 25, further comprising one or more sensors to detect variations in one or more of: temperature, operating frequency, operating voltage, and power consumption. Example 30 includes the system of example 25, wherein one or more of: the logic, the one or more processor cores of the processor, and memory are on a single integrated circuit.

Example 31 includes an apparatus for improving dynamic response of hybrid power boost technology, the apparatus comprising: means for causing modification to performance of one or more processor cores of a processor based on at least two levels of over-current for a charger, means for transitioning the charger from charging one or more battery packs to boosting the performance of at least one of the one or more processor cores of the processor in response to exceeding one of the at least two over-current levels for the charger. Example 32 includes the apparatus of example 31, wherein the at least two levels of over-current are to comprise a slow over-current level for the charger and a fast over-current level for the charger. Example 33 includes the apparatus of example 32, further comprising means for transitioning the charger from charging at least one of the one or more battery packs to boosting the performance of at least one of the one or more processor cores of the processor in response to exceeding the fast over-current level without delay. Example 34 includes the apparatus of example 32, further comprising means for transitioning the charger from charging at least one of the one or more battery packs to boosting the performance of at least one of the one or more processor cores of the processor in response to exceeding the slow over-current level after a delay. Example 35 includes the apparatus of example 31, further comprising means for one or more sensors detecting variations in one or more of: temperature, operating frequency, operating voltage, and power consumption. Example 36 includes the apparatus of example 31, further comprising means for transitioning the charger from charging one or more battery packs to boosting the performance of at least one of the one or more processor cores of the processor in response to an output voltage level of the charger exceeding a threshold value.

Example 37 includes an apparatus for improving dynamic response of hybrid power boost technology, the apparatus comprising: means for causing modification to performance of one or more processor cores of a processor based on comparison of an output voltage level of a charger and a threshold value, means for transitioning the charger from charging one or more battery packs to boosting the performance of at least one of the one or more processor cores of the processor in response to the comparison of the output voltage level of the charger to the threshold value. Example 38 includes the apparatus of example 37, further comprising means for transitioning the charger from charging at least one of the one or more battery packs to boosting the performance of at least one of the one or more processor cores of the processor in response to exceeding the threshold value and without delay. Example 39 includes the apparatus of example 37, further comprising means for transitioning the charger transitioning from charging at least one of the one or more battery packs to boosting the performance of at least one of the one or more processor cores of the processor in response to exceeding a fast over-current level for the charger. Example 40 includes the apparatus of example 37, further comprising means for transitioning the charger transitioning from charging at least one of the one or more battery packs to boosting the performance of at least one of the one or more processor cores of the processor in response to exceeding a slow over-current level for the charger. Example 41 includes the apparatus of example 37, further comprising means for one or more sensors detecting variations in one or more of: temperature, operating frequency, operating voltage, and power consumption.

Example 42 includes a system comprising: a processor having one or more processor cores; logic, at least a portion of which is in hardware, to cause modification to performance of at least one of the one or more processor cores of a processor based on comparison of an output voltage level of a charger and a threshold value; and one or more battery packs, wherein the charger is to transition from charging at least one of the one or more battery packs to boosting the performance of at least one of the one or more processor cores of the processor in response to the comparison of the output voltage level of the charger to the threshold value. Example 43 includes the system of example 42, wherein the charger is to transition from charging at least one of the one or more battery packs to boosting the performance of at least one of the one or more processor cores of the processor in response to exceeding the threshold value and without delay. Example 44 includes the system of example 42, wherein the charger is to transition from charging at least one of the one or more battery packs to boosting the performance of at least one of the one or more processor cores of the processor in response to exceeding a fast over-current level for the charger. Example 45 includes the system of example 42, wherein the charger is to transition from charging at least one of the one or more battery packs to boosting the performance of at least one of the one or more processor cores of the processor in response to exceeding a slow over-current level for the charger. Example 46 includes the system of example 42, further comprising one or more sensors to detect variations in one or more of: temperature, operating frequency, operating voltage, and power consumption. Example 47 includes the system of example 42, wherein one or more of: the logic, the one or more processor cores of the processor, and memory are on a single integrated circuit.

Example 48 includes a computer-readable medium comprising one or more instructions that when executed on a processor configure the processor to perform one or more operations of any of examples 14 to 24.

In various embodiments of the invention, the operations discussed herein, e.g., with reference to FIGS. 1-7, may be implemented as hardware (e.g., logic circuitry), software, firmware, or combinations thereof, which may be provided as a computer program product, for example, including a tangible (e.g., non-transitory) machine-readable or computer-readable medium having stored thereon instructions (or software procedures) used to program a computer to perform a process discussed herein. The machine-readable medium may include a storage device such as those discussed with respect to FIGS. 1-7.

Additionally, such computer-readable media may be downloaded as a computer program product, wherein the program may be transferred from a remote computer (e.g., a server) to a requesting computer (e.g., a client) by way of data signals provided in a carrier wave or other propagation medium via a communication link (e.g., a bus, a modem, or a network connection).

Reference in the specification to "one embodiment" or "an embodiment" means that a particular feature, structure, and/or characteristic described in connection with the embodiment may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments of the invention, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments of the invention have been described in language specific to structural features and/or methodological acts, it is to be understood that claimed subject matter may not be limited to the specific features or acts described. Rather, the specific features and acts are disclosed as sample forms of implementing the claimed subject matter.

The invention claimed is:

1. An apparatus comprising:
   logic, at least a portion of which is in hardware, to cause modification to performance of one or more processor cores of a processor based on at least two levels of over-current for a charger,
   wherein the charger is to transition from charging one or more battery packs to boosting the performance of at least one of the one or more processor cores of the processor in response to exceeding one of the at least two over-current levels for the charger, wherein the charger is to transition from charging at least one of the one or more battery packs to boosting the performance of at least one of the one or more processor cores of the processor in response to exceeding a slow over-current level after a pre-determined delay.

2. The apparatus of claim 1, wherein the at least two levels of over-current are to comprise the slow over-current level for the charger and a fast over-current level for the charger.

3. The apparatus of claim 2, wherein the charger is to transition from charging at least one of the one or more battery packs to boosting the performance of at least one of the one or more processor cores of the processor in response to exceeding the fast over-current level without delay.

4. The apparatus of claim 1, further comprising one or more sensors to detect variations in one or more of: temperature, operating frequency, operating voltage, and power consumption.

5. The apparatus of claim 1, wherein one or more of: the logic, the one or more processor cores of the processor, and memory are on a single integrated circuit.

6. The apparatus of claim 1, wherein the charger is to transition from charging one or more battery packs to boosting the performance of at least one of the one or more processor cores of the processor in response to an output voltage level of the charger exceeding a threshold value.

7. The apparatus of claim 1, wherein the pre-determined delay is to be determined based on expiration of a timer.

8. An apparatus comprising:
   logic, at least a portion of which is in hardware, to cause modification to performance of one or more processor cores of a processor based on comparison of an output voltage level of a charger and a threshold value,
   wherein the charger is to transition from charging one or more battery packs to boosting the performance of at least one of the one or more processor cores of the processor in response to the comparison of the output voltage level of the charger to the threshold value, wherein the charger is to transition from charging at least one of the one or more battery packs to boosting the performance of at least one of the one or more processor cores of the processor in response to exceeding a slow over-current level for the charger and a pre-determined delay.

9. The apparatus of claim 8, wherein the charger is to transition from charging at least one of the one or more battery packs to boosting the performance of at least one of the one or more processor cores of the processor in response to exceeding the threshold value and without delay.

10. The apparatus of claim 8, wherein the charger is to transition from charging at least one of the one or more battery packs to boosting the performance of at least one of the one or more processor cores of the processor in response to exceeding a fast over-current level for the charger.

11. The apparatus of claim 8, further comprising one or more sensors to detect variations in one or more of: temperature, operating frequency, operating voltage, and power consumption.

12. The apparatus of claim 8, wherein one or more of: the logic, the one or more processor cores of the processor, and memory are on a single integrated circuit.

13. The apparatus of claim 8, wherein the pre-determined delay is to be determined based on expiration of a timer.

14. A system comprising:
a processor having one or more processor cores;
logic, at least a portion of which is in hardware, to cause modification to performance of at least one of the one or more processor cores of the processor based on one or more of: at least two levels of over-current for a charger and comparison of an output voltage level of the charger and a threshold value; and
one or more battery packs,
wherein the charger is to transition from charging at least one of the one or more battery packs to boosting the performance of at least one of the one or more processor cores of the processor in response to one or more of: exceeding one of the at least two over-current levels for the charger and the output voltage level of the charger exceeding the threshold value, wherein the charger is to transition from charging at least one of the one or more battery packs to boosting the performance of at least one of the one or more processor cores of the processor in response to exceeding a slow over-current level after a pre-determined delay.

15. The system of claim 14, wherein the at least two levels of over-current are to comprise the slow over-current level for the charger and a fast over-current level for the charger.

16. The system of claim 15, wherein the charger is to transition from charging at least one of the one or more battery packs to boosting the performance of at least one of the one or more processor cores of the processor in response to exceeding the fast over-current level without delay.

17. The system of claim 14, further comprising one or more sensors to detect variations in one or more of: temperature, operating frequency, operating voltage, and power consumption.

18. The system of claim 14, wherein one or more of: the logic, the one or more processor cores of the processor, and memory are on a single integrated circuit.

19. The system of claim 14, wherein the pre-determined delay is to be determined based on expiration of a timer.

20. A system comprising:
a processor having one or more processor cores;
logic, at least a portion of which is in hardware, to cause modification to performance of at least one of the one or more processor cores of a processor based on comparison of an output voltage level of a charger and a threshold value; and
one or more battery packs,
wherein the charger is to transition from charging at least one of the one or more battery packs to boosting the performance of at least one of the one or more processor cores of the processor in response to the comparison of the output voltage level of the charger to the threshold value, wherein the charger is to transition from charging at least one of the one or more battery packs to boosting the performance of at least one of the one or more processor cores of the processor in response to exceeding a slow over-current level for the charger and a pre-determined delay.

21. The system of claim 20, wherein the charger is to transition from charging at least one of the one or more battery packs to boosting the performance of at least one of the one or more processor cores of the processor in response to exceeding the threshold value and without delay.

22. The system of claim 20, wherein the charger is to transition from charging at least one of the one or more battery packs to boosting the performance of at least one of the one or more processor cores of the processor in response to exceeding a fast over-current level for the charger.

23. The system of claim 20, further comprising one or more sensors to detect variations in one or more of: temperature, operating frequency, operating voltage, and power consumption.

24. The system of claim 20, wherein one or more of: the logic, the one or more processor cores of the processor, and memory are on a single integrated circuit.

25. The system of claim 20, wherein the pre-determined delay is to be determined based on expiration of a timer.

* * * * *